United States Patent
Kurtzberg et al.

[11] Patent Number: 6,137,042
[45] Date of Patent: Oct. 24, 2000

[54] VISUAL DISPLAY FOR MUSIC GENERATED VIA ELECTRIC APPARATUS

[75] Inventors: Jerome M. Kurtzberg, Yorktown Heights; John Stephen Lew, Ossining, both of N.Y.

[73] Assignee: International Business Machines Corporation, Armonk, N.Y.

[21] Appl. No.: 09/074,618

[22] Filed: May 7, 1998

[51] Int. Cl.$^7$ .................................................. G09B 15/02
[52] U.S. Cl. ............................ 84/477 R; 84/645; 84/672
[58] Field of Search ........................... 84/477 R, 464 R, 84/645, 623, 633, 634, 647, 672, 674, 477, 478, 464 A

[56] References Cited

U.S. PATENT DOCUMENTS

| | | | |
|---|---|---|---|
| 1,661,058 | 2/1928 | Theremin | 84/674 |
| 5,191,319 | 3/1993 | Kiltz | 340/701 |
| 5,513,129 | 4/1996 | Bolas et al. | 364/578 |
| 5,931,680 | 8/1999 | Semba | 434/307 |

OTHER PUBLICATIONS

Moog, The Theremin, Radio & Television News, pp. 37–79, 1954.

Moog, A Transistorized Theremin, Electronics World, pp. 29–32, 125, 1961.

*Primary Examiner*—David Martin
*Assistant Examiner*—Kim Lockett
*Attorney, Agent, or Firm*—Whitham, Curtis & Whitham; Stephen C. Kaufman, Esq.

[57] ABSTRACT

A visual display is provide for music associated with a theremin or, in general, any space-controlled electric instrument. The theremin is a space-controlled electric instrument that produces an output of sound corresponding to the motion of the user, without being touched by the user. The device establishes a correspondence between motion and electric signals, then between such signals and either light and sound, or just light.

15 Claims, 1 Drawing Sheet

VISUAL DISPLAY FOR MUSIC GENERATED VIA ELECTRIC APPARATUS

BACKGROUND OF THE INVENTION

1. Field of the Invention

The present invention generally relates to the generation of visual displays for music and, more particularly, to visual displays for music produced by space controlled electric apparatus.

2. Background Description

Visual displays are widely used by "rock" musicians in concerts. The displays produce various effects, including stroboscopic effects, smoke and swirling multi-colored lights. Some of these effects are timed with the music. Other visual displays have been provided for various musical instruments or ensembles. In the case of acoustical instruments, these employ a microphone to pick up the sound and convert it to electrical signals, an analog comb filter to divide the electrical signals into a plurality of frequency bands, and then a light control system responsive to the signals in the various frequency bands to generate the visual display. Where the musical instruments are electronic, such as synthesizers, electric guitars and drum machines, the microphone is not required.

A well-known electric apparatus called the "theremin" produces sounds whose pitch and volume are regulated by the position of the performer'hands. The theremin converts motion into electric signals, then such signals into sounds. A brief description of the theremin can be found in *The Concise Oxford Dictionary of Music*, Third Edition, Michael Kennedy, Editor, Oxford University Press, London 1980. An example of the music produced by the theremin may be had from Robert Moog, *Album notes for Clara Rockmore—The ARt of the Theremin*, Delos Compact Disc D/CD 1014, 1987 Delos International, Inc., Santa Monica, Calif.

SUMMARY OF THE INVENTION

It is an object of the present invention to provide a means and method for producing a visual display associated with a theremin or, in general, any space-controlled electric instrument.

The theremin is a space-controlled electric instrument that produces an output of sound corresponding to the motion of the user, without being touched by the user. The inventive device establishes a correspondence between motion and electric signals, then between such signals and either light and sound, or just light.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
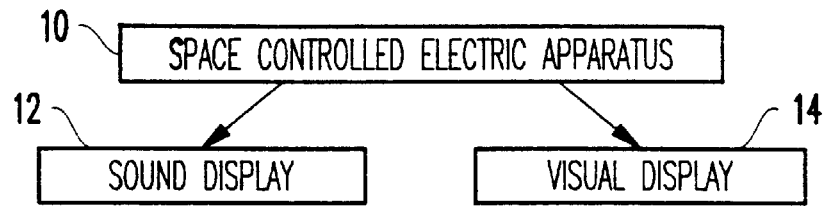
FIG. 1 is a high level block diagram of the inventive space-controlled electric instrument which produces both a sound display and a visual display.

Referring now to the drawings, and more particularly to FIG. 1, there is shown a high level block diagram of the inventive device. The embodiment shown is comprised of a theremin or theremin-like device 10 coupled with the capability of producing sound displays 12 and visual displays 14. Such visual displays in this embodiment exhibit colors with various hues, saturations, and intensities, these properties being associated with corresponding qualities of the sound displays.

The theremin-like device 10 is constructed similarly to a radio receiver, with an antenna and a metal loop. The generation of the sound is an application of heterodyning. Specifically, to produce the sound one uses two high frequency oscillating circuits, one with constant frequency, the other with frequency that experiences small changes when the user makes some movements near the antenna. Amplifying the resultant hetrodyned signal yields the sound. Movement near the metal loop changes the volume.

Figure 2:
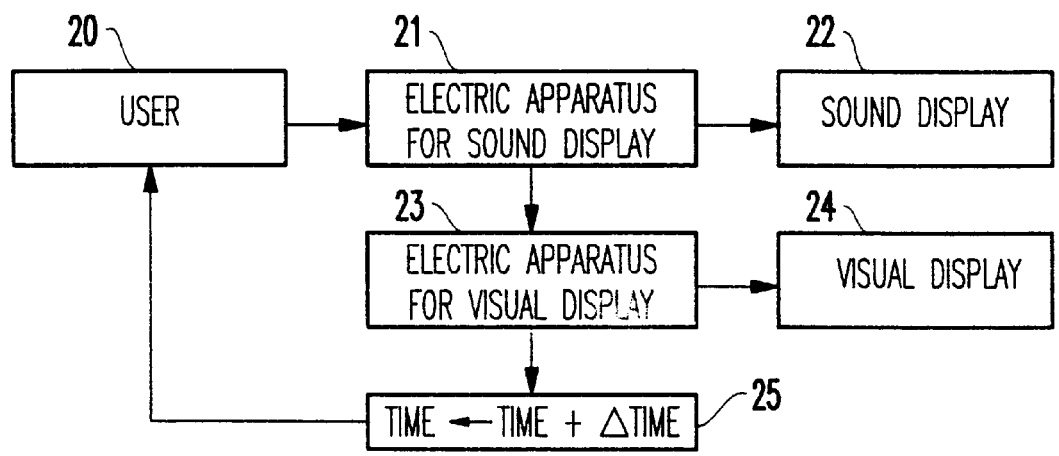
FIG. 2 is a more detailed block diagram of the apparatus for generating sound- and light-displays.

Thus, with reference to FIG. 2, the user 20 moves his or her hands in the vicinity of the antenna and metal loop, which are part of the electric apparatus for sound display 21, and thereby respectively generates the frequency and volume of the signals amplified by the sound display 22.

Figure 3:
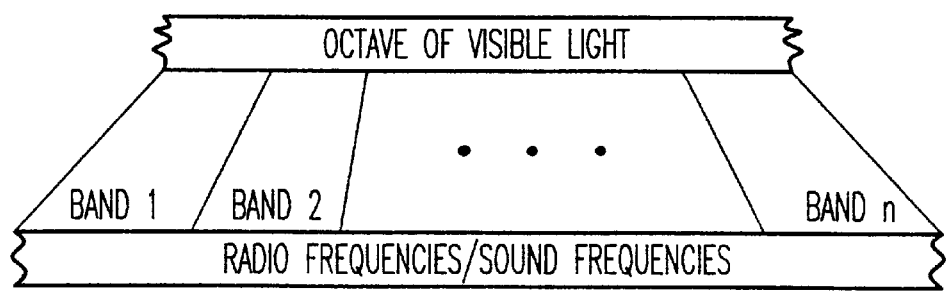
FIG. 3 shows the correspondence between the band of radio- or sound-frequencies and that of the spectrum of visible light.

According to this invention, an electric apparatus for visual display 23 and a corresponding visual display 24 are added to the basic theremin device. One obtains the visual display by associating the desired visual light spectrum with the sound spectrum, or equivalently with the underlying electrical signals. This is shown in FIG. 3 in which the radio frequencies or sound frequencies are divided into bands which are associated with an octave of visible light.

The two oscillating circuits of the theremin device have frequencies well above the range of human hearing. The fixed frequency may have value 170 kilohertz (kHz), the variable frequency, a range of 168–170 kHz. A large inductor connects the antenna to the variable oscillator, and a small capacitance connects the antenna to ground. Antenna and inductor constitute a series resonant circuit, which loads the variable oscillator and increases its frequency. The frequency of the variable oscillator drops when the user moves nearer to the antenna. Finally, from the difference between fixed and variable signals, the difference, or beat, oscillation yields a sound within the range of the human ear.

The associated visual display is produced by activating various colored light bulbs or groups of such light bulbs. The intensity of the various hues is controlled by activation of an appropriate subset of the pertinent group of light bulbs. The saturation value of the various hues is obtained by activation of additional white light bulbs. The visual display is viewed by means of a (huge) TV screen, either by a standard direct video tube or by a projection TV screen, or directly by view of the cited light bulbs.

Within a specific time slice, the performer generates an electric signal that is converted to an auditory display and a visual display. The process advances in real time from time-slice to time-slice. Block 25 in FIG. 2 indicates the advancement from each time-slice to the next one. For simplicity of exposition, this figure shows the auditory display being generated prior to the visual one.

In FIG. 2, the electric apparatus for producing a sound display (block 21) is a theremin or any other space-controlled apparatus for producing sound. The electrical apparatus for producing a visual display (block 23) is a digital computer, such as a personal computer (PC). The inputs to block 23 are the radio frequencies or sound frequencies, and their amplitudes and their purities; that is, the hues, intensities and saturations, respectively.

To produce a hue, block 23 takes the specified bands of sound or radio frequencies given in block 21 and associates these with specified bands of frequencies in the octave of visible light. FIG. 3 depicts the described correspondence between the sound domain and the display of the visible-light octave. To determine the intensity for a band of visible light, one associates it with the amplitude for the corresponding band in the radio or sound domain. Through this correspondence of associated bands, one determines saturation; i.e., purity of color. It is the degree of concentration in a narrow range of frequency bands that determines saturation; that is, the lesser the spread, the purer the color. In this invention, one uses radio frequencies produced as output by the theremin, or theremin-like device, or equivalently one uses the corresponding sound frequencies produced by such a device.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A visual display system for a space-controlled electrical apparatus, said apparatus generating sound based on a proximity of a user to said apparatus, said system comprising:

means for defining a predetermined relationship between a plurality of frequency bands and respective colors of light;

means for determining frequencies of sound signals output from said space-controlled electrical apparatus; and a digital computer executing an application program which generates a visual display of light by correlating of sound signals determined by said determining means to said colors of light based on said relationship defined by said defining means.

2. The system of claim 1, wherein said visual display means generates a visual display of light in real space and in real time.

3. The system of claim 1, wherein said space-controlled electric apparatus is a theremin-type device having an antenna and a conducting loop, said theremin-type device generating sound frequencies based on a proximity of a user to said antenna and generating sound amplitude based on a proximity of said user to said conducting loop.

4. The system of claim 1, wherein said application program receives said sound signals and determines intensities for said colors in said visual display based on an amplitude of said sound signals.

5. The system of claim 1, wherein said application program receives said sound signals and determines saturation for each of said colors based on a concentration of sound signals correlated to each of said colors by said visual display means.

6. The system of claim 1, wherein said application program displays said colors correlated to said frequencies of said sound signals in real time on a time-sliced basis.

7. The system of claim 6, wherein said predetermined relationship defined by said defining means allocates said plurality of frequency bands among respective colors within an octave of light.

8. A method for controlling a visual display of lights in coordination with sound generated from a space-controlled electrical apparatus based on a proximity of a user to said apparatus, said method comprising:

defining a predetermined relationship between a plurality of frequency bands and respective colors of light;

determining frequencies of sound signals output from said space-controlled electrical apparatus; and executing an application program which generates a visual display of light by correlating said frequencies of sound signals determined in said determining step to said colors of light based on said relationship defined in said defining step.

9. The method of claim 8, wherein said executing step includes generating a visual display of light in real space and in real time.

10. The method of claim 8, wherein said space-controlled electric apparatus is a theremin-type device having an antenna and a conducting loop, said theremin-type device generating sound frequencies based on a proximity of a user to said antenna and generating sound amplitude based on a proximity of said user to said conducting loop.

11. The method of claim 8, further comprising:

determining intensities for said colors in said visual display based on an amplitude of said sound signals.

12. The method of claim 8, further comprising:

determining saturation for each of said colors based on a concentration of sound signals correlated to each of said colors.

13. The method of claim 8, wherein said executing step includes displaying said colors correlated to said frequencies of said sound signals in real time on a time-sliced basis.

14. The method of claim 8, wherein said predetermined relationship defined by said defining means allocates said plurality of frequency bands among respective colors within an octave of light.

15. The method of claim 8, further comprising:

displaying said visual display generated by said application program on a television.

* * * * *